United States Patent Office 3,413,327
Patented Nov. 26, 1968

3,413,327
PREPARATION OF CRYSTALLINE GROUP II METAL SALTS OF LOWER ALKYL PHOSPHORODITHIOIC ACID
Curtis L. Gordon, Euclid, Ohio, assignor to The Lubrizol Corporation, Wickliffe, Ohio, a corporation of Ohio
No Drawing. Filed Jan. 27, 1966, Ser. No. 523,245
7 Claims. (Cl. 260—429.9)

ABSTRACT OF THE DISCLOSURE

Crystalline metal salts of lower alkyl phosphorodithioic acids are prepared by reacting the acid, in solution in an aromatic solvent such as benzene or toluene, with a Group II metal base in the presence of a catalytic amount of a metal salt of a lower aliphatic carboxylic acid, preferably acetic acid, and subsequently isolating the crystalline salt by adding water and flashing off the organic solvent.

---

This invention relates to the production of phosphorus-sulfur compounds, and more particularly to an improved method for preparing and isolating Group II metal salts of lower alkyl phosphorodithioic acids.

Metal salts of phosphorodithioic acids are widely used as lubricant additives for inhibiting corrosion and for improving extreme pressure properties. For these purposes, oil-soluble materials are obviously necessary. In certain other applications, such as hydraulic fluid additives, oil solubility is not so important and the lower alkyl phosphorodithioates, which are insoluble in oil, are preferred.

While metal phosphorodithioates with aromatic and higher aliphatic substituents may be prepared in oil solution without ever isolating the pure acid or salt, the lower alkyl-substituted salts must be isolated in crystalline form. It has been proposed that these salts be prepared in an aromatic hydrocarbon, such as benzene, toluene, or xylene, all of which are solvents for these salts, and that the crystalline salt then be isolated by flashing off the solvent by contact with hot water. This procedure fails because the salts are unstable in contact with water and decompose with the evolution of hydrogen sulfide.

A principal object of the present invention, therefore, is to provide an improved method for the preparation of crystalline Group II metal salts of lower alkyl phosphorodithioic acids.

A further object is to provide a method for preparing and isolating these salts without causing decomposition thereof.

Other objects will in part be obvious and will in part appear hereinafter.

It has been discovered that the decomposition of a zinc lower alkyl phosphorodithioate can be prevented by maintaining the reaction system slightly basic. Under those conditions, the zinc salt remains stable even in contact with hot water and can be recovered from aqueous medium in crystalline form.

Accordingly, the objects of this invention are attained by a method for the preparation of a crystalline Group II metal salt of a lower alkyl phosphorodithioic acid, wherein the alkyl groups contain from 1 to about 4 carbon atoms, which comprises: (1) dissolving said acid in an organic liquid which is a solvent for both the acid and the Group II metal salt thereof and which can be readily separated from water by distillation, (2) reacting the solution of said acid with a Group II metal base in the presence of a small amount of a metal salt of a lower aliphatic carboxylic acid, and (3) isolating the salt thus produced by contacting the reaction mixture with water and removing said organic liquid by distillation.

The lower alkyl phosphorodithioic acids suitable for use in the present invention are the methyl, ethyl, propyl and some of the butyl acids. Isobutylphosphorodithioic acid forms an insoluble crystalline salt with a number of Group II metals including zinc. The n-butyl acid forms a 1:1 complex with its zinc salt; this complex is solid and insoluble and may be isolated in the same way as the normal zinc salts of the other acids.

The acids are prepared by methods well known in the art, generally by the reaction of four moles of the appropriate alcohol or mixture of alcohols with one mole of phosphrus pentasulfide at about 50–100° C. This reaction may be effected by merely mixing the reactants. A solvent may be used but is seldom necessary or desirable. Hydrogen sulfide is evolved during the reaction and the residue is the desired acid.

The Group II metals suitable for use in the method of this invention include, for example, zinc, barium, cadmium, calcium and the like. Zinc is preferred because of the particular suitability of zinc salts for use as additives. The metal is provided for the purposes of this invention in the form of a metal base, such as an oxide, hydroxide, carbonate or the like. Usually, the oxide or hydroxide (e.g., zinc oxide) is preferred.

The first step of the method of this invention is the dissolution of the lower alkyl phosphorodithioic acid in an organic liquid which is a solvent for both the acid and the metal salt, and which can be easily separated from water by distillation. From the standpoint of separability from water, such liquids include those which boil at substantially lower temperatures than water and those which form low-boiling azeotropes with water. The solubility requirement is somewhat more restrictive, since solvents for the zinc salts are few. The aromatic hydrocarbons such as benzene, toluene and xylene are suitable, however. Because of its relatively low cost and availability, benzene is the preferred solvent.

In practice, it is often found convenient to form a suspension of the metal base in the organic liquid and thereafter to add the phosphorodithioic acid.

The reaction between the lower alkyl phosphorodithioic acid and the metal base is effected in the presence of a small amount of a metal salt of a lower alkyl carboxylic acid, preferably containing the same metal as the metal base. This salt may be conveniently provided by adding the corresponding acid to the metal base, whereby the salt is immediately formed. For example, acetic acid may be added to a zinc oxide suspension in benzene to provide zinc acetate. The term "lower alkyl" includes, in general, acids containing from about 1 to 4 carbon atoms; acetic acid is preferred because of its cheapness and availability.

The amount of metal carboxylate present in the reaction mixture is not critical. As a general rule, a catalytic amount (about 5–10 parts per hundred parts of metal base is suitable. All that is necessary is that the reaction medium be slightly basic after the metal salt of the phosphorodithioic acid has been prepared and at the time said salt comes into contact with water.

While the present invention is not intended to be restricted to any particular theory, it is believed that the metal carboxylate serves as a transfer agent or the like for the formation of the metal phosphorodithioate from the acid and metal base. Thus, it apparently promotes ready neutralization of the acid in the heterogeneous reaction medium.

Following the neutralization of the phosphorodithioic acid with the metal base, the salt is isolated by contacting the reaction mixture with water and removing the organic solvent. It is of critical importance that the reaction mixture be basic at the time this contact is effected, and the most important function of the metal salt of the lower alkyl carboxylic acid at this stage is to maintain a slightly basic environment during this operation. If the system is acidic or neutral at this time, the metal phosphorodithioate will decompose.

In a preferred embodiment of the method of this invention, the reaction solvent is an aromatic hydrocarbon such as benzene, which is insoluble in water. The isolation of the crystalline salt is then effected by heating the water to about 75–100° C. and adding the benzene solution of the salt thereto. The benzene is removed by flash distillation as a benzene-water azeotrope and the zinc lower alkyl phosphorodithioate remains as an aqueous slurry. This slurry may be filtered to yield the desired salt in a nearly pure state.

The invention is illustrated by the following examples. All parts are by weight.

Example 1

A suspension of 58 parts of zinc oxide and 1.6 parts of acetic acid in 664 parts of benzene is agitated for 30 minutes at about 27–38° C., and then 300 parts of diisopropylphosphorodithioic acid is added at 27–52° C. The reaction mixture is heated to 63° C. and one additional part of zinc oxide is added; it is then cooled to 49° C. and filtered.

To 1470 parts of water at 80–82° C. is added, over four hours, 980 parts of the benzene solution of the zinc phosphorodithioate prepared as described above. The mixture is distilled; the benzene-water azeotrope passes over and is separated, and the aqueous phase is recycled to the distillation pot. After all the benzene has been removed, the undistilled material comprises a 17.5 percent slurry of the zinc salt in water. This slurry is cooled to about 50° C. and filtered to yield zinc diisopropylphosphorodithioate as a light yellow crystalline solid. The wet material is dried at 66° C./25 mm.; the product (310 parts or 90% of the theoretical amount) melts at 130° C. and has the following analysis.

Calculated: P, 12.6%; S, 26.1%; Zn, 13.3%. Found: P, 12.8%; S, 25.9%; Zn, 13.4%.

Example 2

The procedure of Example 1 is repeated, except that the diisopropylphosphorodithioic acid is replaced by 266 parts of diethylphosphorodithioic acid. The product is crystalline zinc diethylphosphorodithioate.

Example 3

Following the procedure of Example 1, 334 parts of diisobutylphosphorodithioic acid is reacted with 110 parts of barium oxide. The product is crystalline barium diisobutylphosphorodithioate.

What is claimed is:
1. A method for the preparation of a crystalline Group II metal salt of a lower alkyl phosphorodithioic acid, wherein the alkyl groups contain from 1 to about 4 carbon atoms, which comprises: (1) dissolving said acid in an organic liquid which is a solvent for both the acid and the Group II metal salt thereof and which can be readily separated from water by distillation, (2) reacting the solution of said acid with a Group II metal base in the presence of a small amount of a metal salt of a lower aliphatic carboxylic acid, (3) contacting the reaction mixture with water and removing said organic liquid by distillation, thereby forming an aqueous slurry of said crystalline phosphorodithioic acid salt, and subsequently isolating said crystalline salt from said slurry.

2. The method of claim 1 wherein the organic liquid is an aromatic hydrocarbon.

3. The method of claim 1 wherein the organic liquid is benzene.

4. The method of claim 1 wherein the Group II metal base is zinc oxide and the metal carboxylic acid salt is a zinc salt.

5. The method of claim 4 wherein the metal carboxylic acid salt in zinc acetate.

6. The method of claim 1 wherein the lower alkyl phosphorodithioic acid is isopropylphosphorodithioic acid.

7. A method according to claim 1 which comprises the steps of (1) dissolving isopropylphosphorodithioic acid in benzene, (2) reacting the solution thus formed with zinc oxide in the presence of a small amount of zinc acetate, and (3) removing the benzene by introducing the solution into hot water, distilling a benzene-water azeotrope and recovering crystalline zinc isopropylphosphorodithioate from the aqueous medium.

References Cited

UNITED STATES PATENTS

| | | | |
|---|---|---|---|
| 3,004,996 | 10/1961 | Arakelian | 260—429.9 |
| 3,277,133 | 10/1966 | Asseff | 260—429.9 |
| 3,290,347 | 12/1966 | Miller | 260—429.9 |
| 3,328,335 | 6/1967 | Jolie | 260—429.9 XR |
| 3,347,790 | 10/1967 | Meinhardt | 260—429.9 XR |
| 3,351,647 | 11/1967 | Butler et al. | 260—429.9 |

TOBIAS E. LEVOW, *Primary Examiner.*

H. M. S. SNEED, *Assistant Examiner.*